United States Patent [19]

Boie et al.

[11] Patent Number: 4,810,615
[45] Date of Patent: Mar. 7, 1989

[54] COLOUR PHOTOGRAPHIC RECORDING MATERIAL CONTAINING A DYE RELEASING COMPOUND FOR CYAN DYES AND A COLOUR IMAGE PRODUCED WITH THESE DYES

[75] Inventors: Immo Boie, Niederkassel; Hans Vetter, Koelin; Kaspar Wingender, Leverkusen, all of Fed. Rep. of Germany

[73] Assignee: Agfa-Gevaert Aktiengesellschaft, Leverkusen, Fed. Rep. of Germany

[21] Appl. No.: 59,634

[22] Filed: Jun. 8, 1987

[30] Foreign Application Priority Data

Jun. 21, 1986 [DE] Fed. Rep. of Germany ....... 3620824

[51] Int. Cl.$^4$ .......................... G03C 5/54; G03C 7/26
[52] U.S. Cl. .................................. 430/203; 430/223; 430/226; 430/241; 430/242; 430/559
[58] Field of Search ............... 430/223, 224, 226, 559, 430/222, 241, 242, 243, 203

[56] References Cited

U.S. PATENT DOCUMENTS 4,439,513  3/1984  Sato et al. ........................... 430/223
4,559,290 12/1985  Sawada et al. ..................... 430/223
4,606,991  8/1986  Kawata et al. ..................... 430/223

Primary Examiner—Richard L. Schilling
Attorney, Agent, or Firm—Connolly & Hutz

[57] ABSTRACT

Dye releasing compounds which release dyes corresponding to formula I

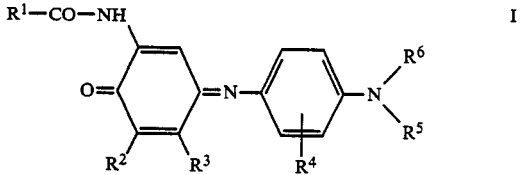

wherein
$R^1$ denotes alkyl, aryl, arylamino, alkoxy or aryloxy,
$R^2$ denotes H or halogen,
$R^3$ denotes alkyl with 2-4 carbon atoms,
$R^4$ denotes H or one or more substituents such as alkyl, alkoxy, acylamino or halogen, including a substituent in the ortho-position to the group

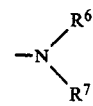

which together with $R^5$ completes a cyclic amino group,
$R^5$ denotes alkyl with up to 4 carbon atoms or a group which together with a subsitutent denoted by $R^4$ or together with $R^6$ completes a cyclic amino group, and
$R^6$ denotes alkyl with up to 4 carbon atoms or a group which together with $R^5$ completes a cyclic amino group are suitable for the production of light-stable cyan colour images.

4 Claims, No Drawings

COLOUR PHOTOGRAPHIC RECORDING MATERIAL CONTAINING A DYE RELEASING COMPOUND FOR CYAN DYES AND A COLOUR IMAGE PRODUCED WITH THESE DYES

This invention relates to a colour photographic recording material for the production of colour images by the dye diffusion transfer process containing a non-diffusible, colour providing compound (dye releasing compound) in association with at least one light-sensitive silver halide emulsion layer, which compound releases a diffusible cyan dye on development.

The basic principle on which the dye diffusion process operates is that when development takes place, an imagewise distribution of diffusible dyes is produced in a light-sensitive element in accordance with a previous exposure and is transferred to an image receptor element.

It is very important in this process that the dyes should be fixed sufficiently firmly in the image receptor layer and that they should have excellent spectral properties and stability to light and heat.

Cyan dyes for the dye diffusion process containing a phthalocyanine group as chromophore, preferably in the form of the copper complex, have been disclosed, for example, in DE-A-3 101 036.

One disadvantage of these extremely stable dyes is that they are less diffusible than the yellow and magenta dyes conventionally used, with the result that a colour shift from red to neutral gradually takes place in the course of the colour transfer and the optimum transfer time must be strictly observed.

Rapidly diffusible cyan dyes for the dye diffusion process have been described among the series of 4-(4-nitrophenylazo)-1-naphthols, e.g. in DE-A-2 406 653 and DE-A-2 853, 584.

The dyes mentioned in DE-A-2 406 653 exist in the form of an anionic chromophore after the carrier group which confers diffusion reistance has been split off, and in this form the dyes diffuse into the image receptor layer and are fixed on the mordant in the form of the dye anion. Anionic dyes generally have little fastness to light. It is therefore not surprising that the cyan anionic dyes from the series of 4-(4-nitrophenylazo)naphthols have insufficient fastness to light. With a view of overcoming this disadvantage, dyes from the same class but with improved light-fastness due to an additional carbamoyl substitution in the ortho-position to the OH group have been described in DE-A-2 853 584. These more light-stable dyes, however, in many cases have an absorption for wavelengths which are too short or an absorption range which is too wide and/or their side absorption is too high, and these various factors generally impair the colour reproduction.

Another feature common to these dyes is that their susceptibility to attack by reducing agents is increased by the presence of a nitro group in the para-position to the azo group. Quite apart from developer substances, however, reducing agents are present in virtually all recording materials used in dye diffusion transfer processes to fulfil certain functions. For example, the interlayers between the individual layer packets associated with different partial colours normally contain reducing agents, in particular from the series of mono- or dialkylated hydroquinones, which are the purpose of trapping developer oxidation products and are accordingly highly reactive.

Furthermore, recording materials which contain reducible dye releasing compounds have so-called electron donor compounds (ED compounds) or their precursors associated with these dye releasing compounds. This is described in the following Applications: EP-A-0 004 399, U.S. Pat. No. 4,139,379, U.S. Pat. No. 4,278,750, DE-A-3 014 699, EP-A-0 038 092, DE-A-3 008 588 and DE-A-3 006 268.

It is known that 4-nitrophenylazo dyes are more readily attacked by reducing agents than other monoazo dyes. Even the brief contact between reducing agent and chromophore during the time of formation of the image may be sufficient in the presence of a strongly alkaline processing medium to change the cyan dye to compounds of an unknown structure which absorb light in a shorter wavelength region so that the colour shade changes from cyan to blue or even violet.

It is therefore desirable for the purpose of the dye diffusion process to provide readily diffusible cyan dyes which do not contain a 4-nitrophenylazo group and are therefore less readily reduced.

The light fastness of dyes, in particular of azo dyes, may in many cases be increased by complex formation with polyvalent metal ions. If this complex formation is carried out subsequently, i.e. after release of the dyes from the dye releasing compound, then it is not always possible to avoid discolouration of the recording material or of the image receptor layer by the free metal ions.

Diffusible forms of indoaniline dyes known from chromogenic colour photography have also been described as suitable cyan dyes for the dye diffusion process.

Descriptions of such dyes are given, for example, in U.S. Pat. No. 3,227,550, e.g. the couplers XXIII and XXVIII. One disadvantage of these compounds is that if the colour developer required for development is present in excess, this excess is not removed and impairs the whites by brown discolouration when the image is kept in storage. The known cyan dyes of this type are also insufficiently stable to light.

Indoaniline dyes may also be prepared from the corresponding leuco dyes by oxidation without requiring colour developers. This oxidation may be brought about, for example, by a reaction of the leuco dyes with the oxidation products of an auxiliary developer.

Owing to the sensitivity of leuco dyes to oxidation, photographic recording materials of this kind have a considerable tendency to fogging. Moreover, the dye diffusion process requires the use of additional silver halide to bring about not only imagewise mobility of the dye but also oxidation of the leuco dye.

The use of azomethine and indoaniline dyes in the dye diffusion process is also made more difficult by the fact that the dyes are readily destroyed by hydrolysis at the high pH levels required for dye release and diffusion so that weaker and blackened colours are obtained.

It is an object of the present invention to provide new colour providing compounds for the dye diffusion transfer process, from which diffusible cyan dyes which have improved light fastness, improved spectral properties and improved resistance to alkalies and reducing agents are released in the course of photographic development.

The present invention relates to a colour photographic recording material for the production of colour images by the dye diffusion transfer process, in which a nondiffusible, colour providing compound (dye releasing compound) is associated with at least one light-sensitive silver halide emulsion layer, a diffusible cyan dye being released from this compound under the conditions of alkaline development as a function of the development of the silver halide emulsion layer, characterised in that the cyan dye corresponds to the following formula I:

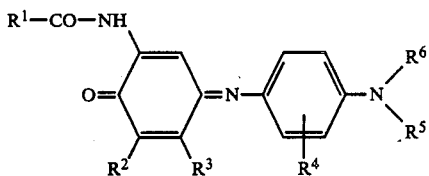

wherein
$R^1$ denotes alkyl, aryl, arylamino, alkoxy or aryloxy,
$R^2$ denotes H or halogen,
$R^3$ denotes alkyl with 2 to 4 carbon atoms,
$R^4$ denotes H or one or more substituents such as alkyl, alkoxy, acylamino or halogen, including a substituent in the ortho-position to the group

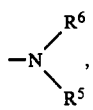

which substituent combines with $R^5$ to complete a cyclic amino group,
$R^5$ denotes alkyl with up to 4 carbon atoms or a group which together with a substituent denoted by $R^4$ or together with $R^6$ completes a cyclic amino group, and
$R^6$ denotes alkyl with up to 4 carbon atoms or a group which together with $R^5$ completes a cyclic amino group.

An alkyl group denoted by $R^1$, $R^4$, $R^5$ or $R^6$ or contained in the alkoxy or acylamino substituents denoted by $R^4$ preferably contains 1 to 4 carbon atoms. It may be straight chained or branched and may in turn be substituted, e.g. by halogen, hydroxyl, alkoxy, aroxy or acylamino. The alkyl group denoted by $R^3$ preferably is ethyl or isopropyl.

An aryl or arylamino group denoted by $R^1$ is preferably a phenyl or aniline group which may be substituted by halogen, CN, alkyl, alkoxy, alkylsulphonyl or alkylsulphamoyl.

The cyclic amino group mentioned in the definition or $R^4$, $R^5$ and $R^6$ is a 5-, 6-, or 7-membered cyclic amino group, which if it is formed by $R^4$ and $R^5$, is condensed on a benzene ring. Examples are the pyrrolidine, piperidine, morpholine and indolenine group.

An acyl group (acylamino) is preferably derived from aliphatic carboxylic or sulphonic acids containing up to 4 carbon atoms.

The dyes of formula I also have suitable functional groups for adjusting the diffusion and mordanting properties, e.g. in the form of the groups mentioned as substituents or in the form of substituents which may be attached to one of these groups through a suitable connecting member. Examples of these functional groups include anionic and anionisable groups such as sulphonate, sulphinate, phenolate, naphtholate, carboxylate, disulphimide and sulphamoyl groups. In addition, the dyes of formula I contain a functional group obtained by the opening of a bond on a carrier group which contains a ballast group, this functional group being characteristic of the carrier group and the linkage by which it is attached to the carrier group. The last mentioned functional group may be identical with one of the above mentioned groups which modify the diffusion and mordanting characteristics. The said functional group may, for example, be attached to an alkyl or aryl group which may in turn form part of one of the above mentioned groups and is preferably a component of $R^1$.

Formula I denotes the diffusible dyes according to this invention, optionally released in the course of development. These dyes may be released, for example, from the corresponding non-diffusible, colour providing compounds (dye releasing compounds) incorporated in the layer. These are compounds in which, for example, a dye residue corresponding to formula I is attached to a carrier group CAR containing at least one ballast group, optionally with the interposition of a suitable connecting member.

The member through which the dye of formula I is attached to the carier group may be, for example, one of the substituents $R^1$ to $R^6$. The dye releasing compounds according to the invention may therefore be represented, for example, by the following formula II

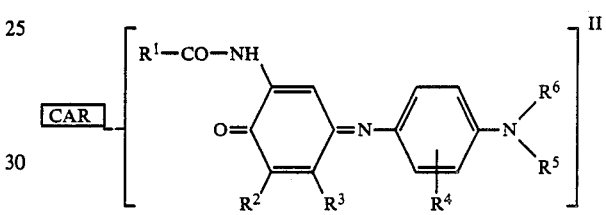

wherein
$R^1$-$R^6$ have the meanings already indicated,
CAR denotes a carrier group containing at least one group which confers diffusion resistance,
and the broken line represents a possible linkage.
In the dye releasing compounds according to the invention corresponding to formula II, therefore, the carrier group is contained as a substituent in one of the groups $R^1$ to $R^6$, preferably in $R^1$ or $R^6$.

In addition to containing a ballast group, the carrier group represented by CAR contains at least one group which can be split off as a function of the development of a silver halide emulsion layer so that the dye attached to the carrier group can be separated from the ballast group, possibly together with a small fragment of the original carrier group, and can thereby be released from its attachment to the layer. The carrier groups may vary in structure according to the function of the releasable group.

The dye releasing compounds according to this invention may be any of numerous types of compounds which are all distinguished by a connecting member which is redox dependent in the strength of its attachment and which links a dye residue to a carrier group containing a ballast group.

See in this connection a summarizing account of this field in Angew. Chem. Int. Ed. Engl. 22 (1983), 191-209, in which the most important of the known systems are described.

Particularly advantageous compounds of this kind are redox active dye releasing compounds corresponding to the formula

BALLAST—REDOX—DYE wherein

BALLAST: denotes a ballast group,

REDOX: denotes a redox active group, i.e. a group which is oxidizable or reducible under the conditions of alkaline development and which can undergo varying degrees of an elimination reaction, a nucleophilic displacement reaction, hydrolysis or some other decomposition reaction, depending on whether it is present in the oxidized or the reduced state, the said reactions resulting in the release of the DYE residue, and DYE: denotes the residue of a diffusible dye, in the present case a dye corresponding to formula I.

Ballast groups enable the dye releasing compounds according to the invention to be incorporated in a diffusion fast form in the hydrophilic colloids normally used in photographic materials. They are preferably organic groups, generally straight chained or branched aliphatic groups with generally 8 to 20 carbon atoms, optionally containing carbocyclic or heterocyclic, optionally aromatic groups. These ballast groups may be attached to the remaining part of the molecule either directly or indirectly, e.g. through one of the following groups: NHCO, NHSO$_2$, NR (in which R denotes hydrogen or alkyl), O or S. The ballast group may in addition contain water-solubilizing groups, e.g. sulpho or carboxyl groups, and these may also be present in an anionic form. Since the diffusion characteristics depend on the molecular size of the whole compound, it is sometimes sufficient, e.g. if the molecule as a whole is large enough, to use shorter chained groups as ballast groups.

Redox active carrier groups having the structure BALLAST-REDOX- and corresponding dye releasing compounds are known in various forms. A detailed description need not be given here in view of the comprehensive article in Angew. Chem. Int. Ed. Engl. 22 (1983) 191–209.

Some examples of redox active carrier groups from which a dye residue is split off according to a previous imagewise oxidation or reduction are shown below purely for illustration:

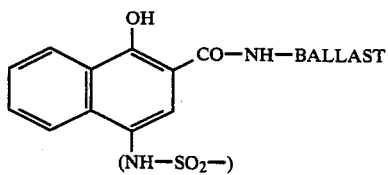

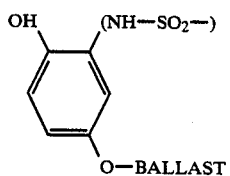

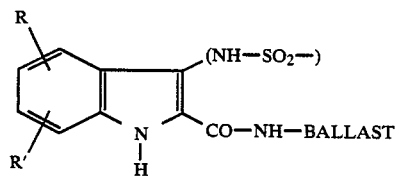

-continued

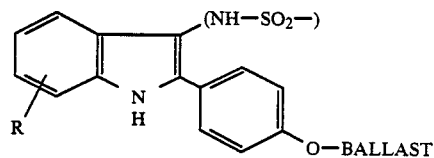

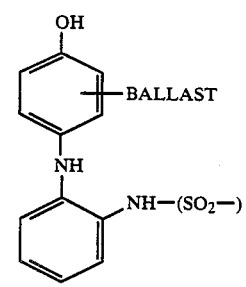

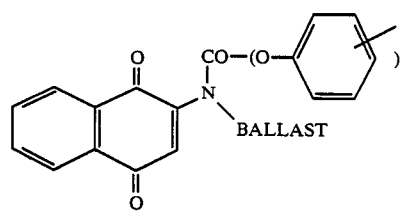

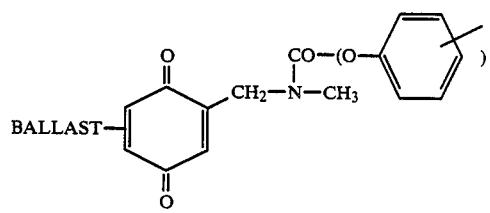

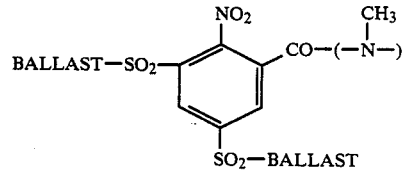

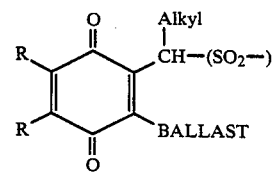

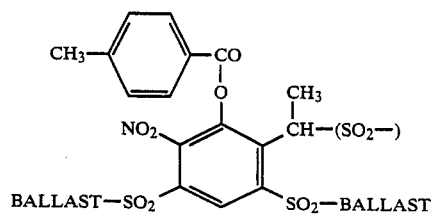

-continued

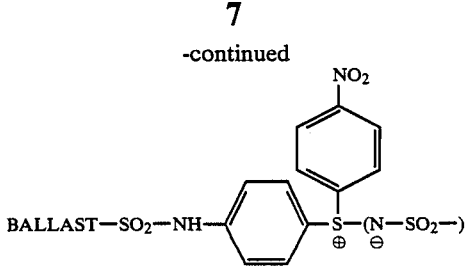

The groups in brackets are functional groups of the dye residue and are separated together with this residue from the remaining part of the carrier group. The functional group may be one of the substituents mentioned in the definition of the groups $R^1$ to $R^6$ in formulae I and II and may have a direct influence on the absorption properties of the released dye. On the other hand, the functional group may be separated from the chromophore of the dye by an intermediate or linking member if it is present as substituent in one of the groups $R^1$ to $R^6$ and need not have any influence on the absorption properties. Lastly, the functional group may be of some importance together with the intermediate member in influencing the diffusion, mordanting and stability properties of the released dye. Alkylene and arylene groups, for example, may be suitable intermediate members.

Suitable dye releasing compounds have been described in the following: U.S. Pat. Nos. 3,227,550; 3,443,939; 3,443,940; DE-A-1 930 215, DE-A-2 242 762, DE-A-2 402 900, DE-A-2 406 664, DE-A-2 505 248, DE-A-2 543 902, DE-A-2 613 005, DE-A-2 645 656, DE-A-2 809 716, DE-A-2 823 159, DE-A-861 241, EP-A-0 004 399, EP-A-0 004 400, DE-A-3 008 588, DE-A-3 014 669, EP-A-0 038 092.

The dye releasing compounds may be oxidizable or capable of coupling in some embodiments of the recording material of the present invention while in others it may be present in a reducible form. When a conventional negative silver halide emulsion is used, the copy obtained from the original may be a negative or a positive, depending on whether the dye is released from the oxidized or the reduced form of dye releasing compound. It is therefore possible to obtain positive or negative images as desired by suitable choice of the dye releasing systems.

For producing positive colour images from positive original by means of negative silver halide emulsions it is suitable to use, for example, a recording material according to the invention containing reducible dye releasing compounds with a carrier group corresponding to the following formula:

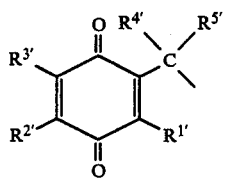 "Carquin"

wherein
$R^{1'}$ denotes alkyl or aryl,
$R^{2'}$ denotes alkyl, aryl or a group which together with $R^{3'}$ completes a condensed ring,
$R^{3'}$ denotes hydrogen, alkyl, aryl, hydroxyl, a halogen such as chlorine or bromine, amino, alkylamino or dialkylamino, including cyclic amino groups (such as piperidino or morpholino), acylamino, alkylthio, alkoxy, aroxy, sulpho or a group which together with $R^{2'}$ completes a condensed ring,
$R^{4'}$ denotes alkyl and
$R^{5'}$ denotes alkyl or, preferably, hydrogen,
and at least one of the groups $R^{1'}$ to $R^{4'}$ contains a ballast group.

The preparation of indoaniline dyes according to the invention corresponding to formula I and of dye releasing compounds corresponding to formula II is normally carried out in several steps, one of which forms the linkage to the carrier group which confers diffusion resistance while another is concerned with the synthesis of the chromophore.

The chromophore is generally produced by a process of chromogenic coupling in which conventional colour developer compounds are reacted in the presence of an oxidizing agent with a compound corresponding to the following formula III

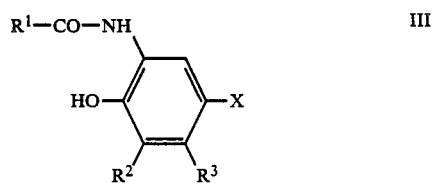

wherein $R^1$, $R^2$ and $R^3$ have the meanings indicated above and X denotes hydrogen or a group which can be split off in this reaction, e.g. halogen, alkoxy or alkylthio.

Attachment to the carrier group may be carried out by basically known methods, either before or after formation of the chromophore.

The attachment may be effected either through the coupler residue or through the colour developer residue, provided these residues carry the appropriate function for the reaction with the carrier residue. The functions required depend, of course, on the group in the carrier residue which is to enter into a reaction with such a function. The functions may be, for example, amino groups, hydroxy groups, sulphonic acid chloride groups, sulphinic acid groups, carboxylic acid groups, carboxylic acid chloride groups, etc.

Examples of cyan dyes (C-) according to the invention are shown below. Compounds marked by an asterisk (*) are model dyes.

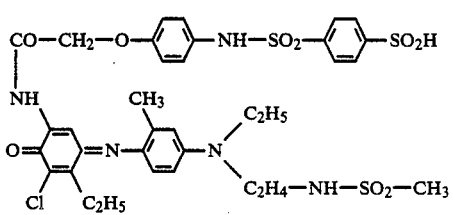 C-1

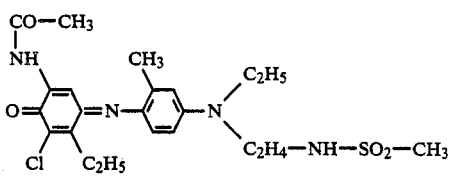 C-2(*)

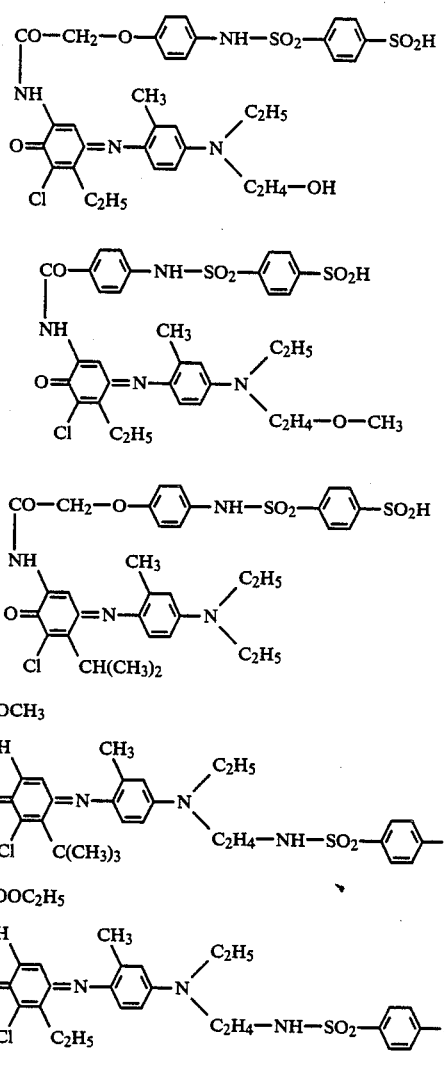
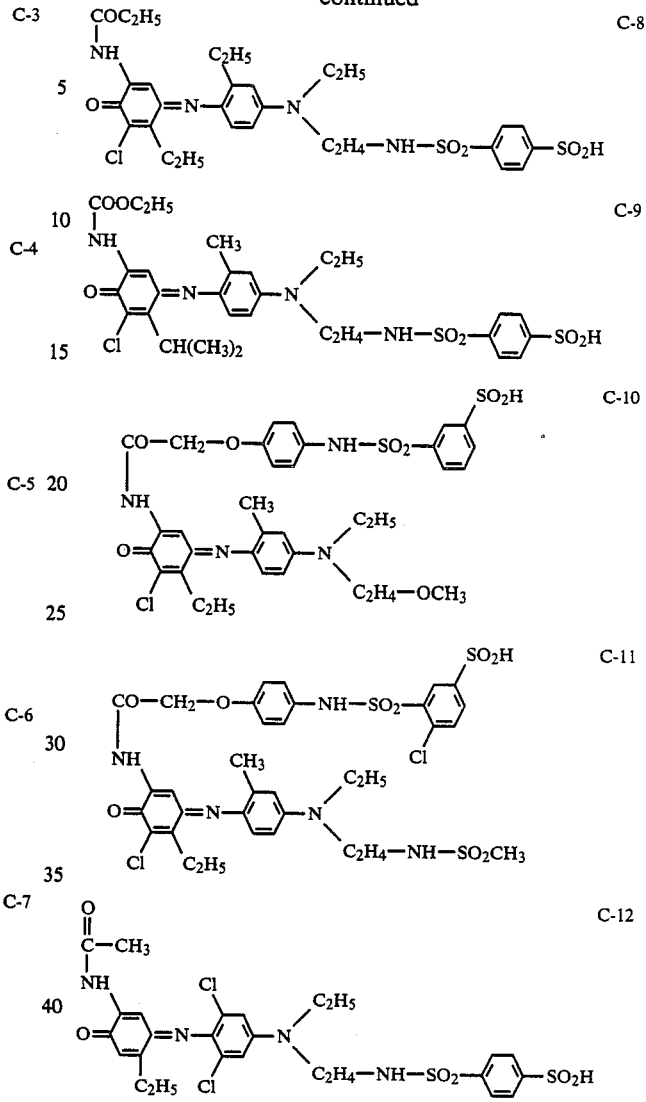
Dye releasing compounds (FA-) according to the invention are shown below:
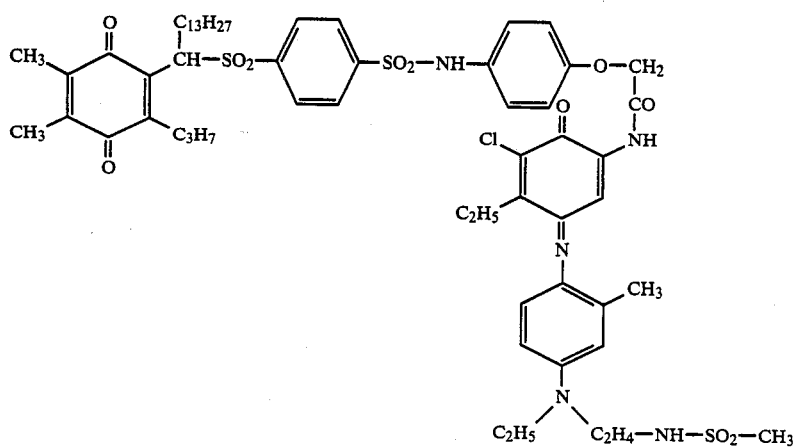

-continued
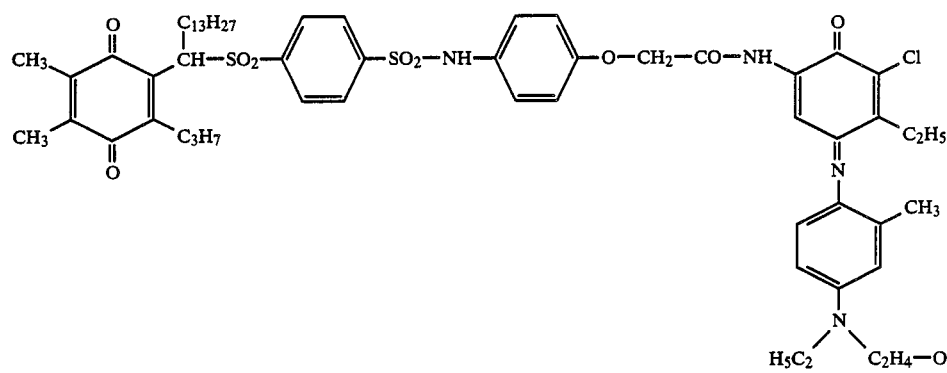
FA-2
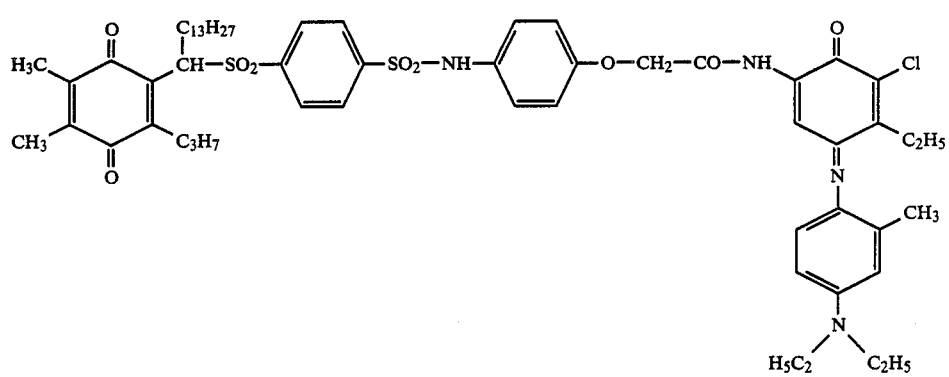
FA-3
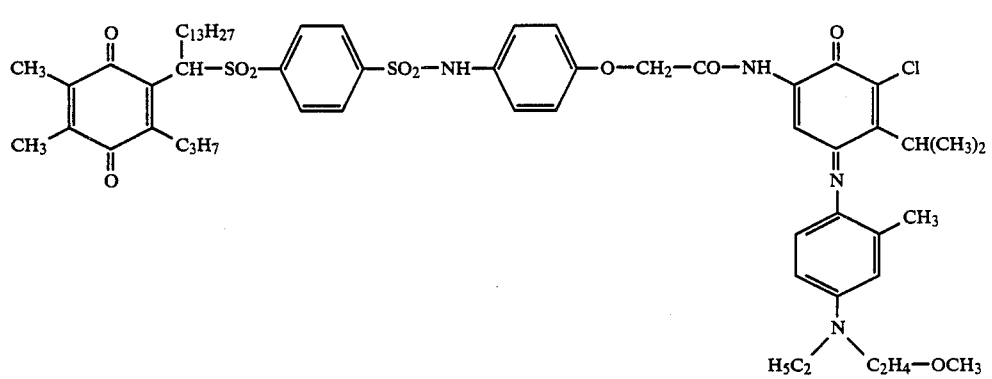
FA-4
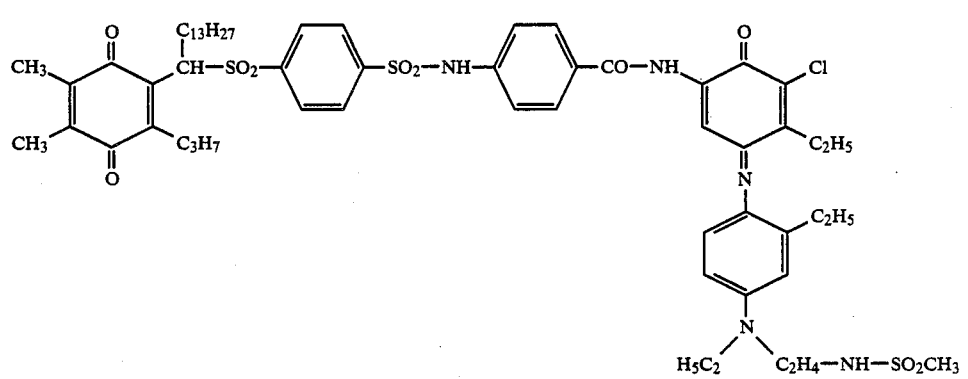
FA-5

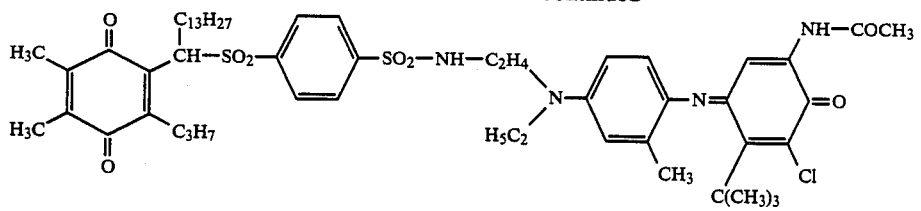

FA-6

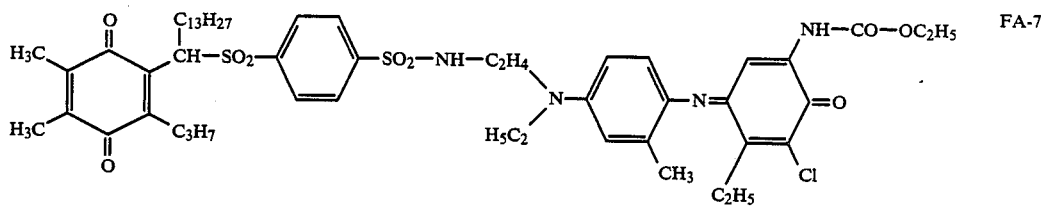

FA-7

Methods of synthesis of the dye releasing compounds according to the invention are illustrated below by way of example:

a. 4-Nitrophenoxyacetyl-(2-hydroxy-3,5-dichloro-4-ethylanilide)

41.2 g (0.2 mol) of 2-hydroxy-3,5-dichloro-4-ethylaniline were dissolved in 250 ml of acetone and 24.3 ml of pyridine and cooled to 0°-5° C. 4.3 g (0.2 mol) of 4-nitrophenoxy-acetic acid chloride were added and the reaction mixture was stirred for one hour. After the addition of 500 ml of water, the mixture was suction filtered and washed with water. The residue was heated to boiling in 250 ml of water to 250 ml of methanol, cooled, suction filtered and again washed with water and methanol. It was then heated to boiling with 350 ml of acetone, cooled, suction filtered, washed with acetone and dried.

b.

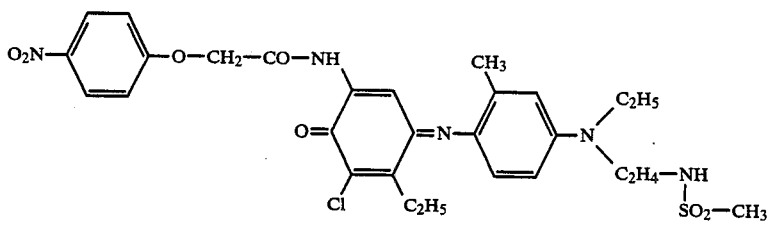

34.6 g (0.09 mol) of the product obtained under a. and 39.4 g (0.09 mol) of 4-amino-3-methyl-(N-ethyl-N-β-methylsulphonylaminoethyl-aniline sulphate were stirred in 500 ml of methanol, and 135 ml of a 30% sodium methanolate solution (0.73 mol) were added. A solution of 44.5 g (0.19 mol) of ammonium persulphate in 100 ml of water and 200 ml of methanol was added dropwise at 20°-25° C. The reaction mixture was stirred for one hour, suction filtered, washed with methanol and dried.

c. Dye releasing compound FA-1.

16.5 g of the compound obtained under b. were stirred together with 300 ml of glacial acetic acid until a homogeneous suspension was obtained. 36 g of zinc dust were added in four portions at 40°-50° C. After reduction has been completed, the residue was suction filtered and washed with glacial acetic acid. 300 ml of 5N-sodium hydroxide solution were slowly added to the glacial acetic acid solution with cooling to 15°-20° C. and the reaction mixture was extracted 5 times by shaking with methylene chloride (150 ml, 100 m, 50 ml, 50 ml and 50 ml). The methylene chloride phase was washed with 1% sodium dithionite solution, dehydrated with sodium sulphate and filtered. To this solution was added a solution of 16.5 g of the sulphochloride corresponding to formula

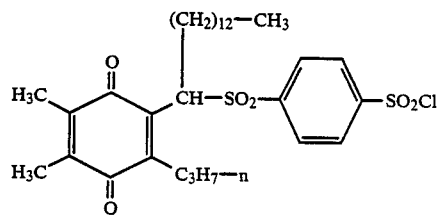

in 70 ml of methylene chloride. 41 ml of pyridine were then added and the reaction mixture was stirred for one hour. At this stage, the dye residue present in the form of a leuco dye oxidized to the indoaniline dye. After removal of the solvent, the smeary residue was treated with water twice on a steam bath and the lumps obtained on cooling were broken down in water, suction filtered, washed with water and dried.

28 g of the resulting crude product were chromatographed on a silica gel column, using a 97:3 mixture of methylene chloride and methanol. The fraction containing the product was freed from solvent and the residue was boiled with 120 ml of ethanol, suction filtered when cold, washed with ethanol and dried. Yield: 5.1 g of dye releasing compound FA-1.

When the dye releasing compounds according to the present invention are developed, they give rise to diffusible dyes which produce a cyan colour image in the image receptor layer. This image has excellent light fastness and stability to heat, moisture and alkali and is less sensitive to reducing agents.

Colour photographic recording materials for the production of multicolour images normally contain colour providing compounds in spatial and spectral association with the silver halide emulsion layers of the different spectral sensitivities. These colour providing compounds serve to produce the various partial colour images in cyan, magenta and yellow and in the present case consist in particular of dye releasing compounds.

By "spatial association" is meant that the dye releasing compound is in such a spatial relationship to the silver halide emulsion layer that the two layers are capable of interacting to produce an imagewise correlation between the silver image formed on development and the colour image produced from the dye releasing compound. This is generaly achieved by arranging the dye releasing compound in the silver halide emulsion layer or in an adjacent layer of binder which may be light insensitive.

By "spectral association" is meant that the spectral sensitivity of each of the light-sensitive silver halide emulsion layers and the colour of the partial colour image produced from the dye releasing compound which is spatially associated with the given silver halide emulsion layer have a certain relationship to one another so that each of the spectral sensitivities (red, green, blue) is associated with a different colour of the particular partial colour image (in general, for example, the cyan, magenta and yellow in this sequence).

One or more dye releasing compounds may be associated with each of the differently spectrally sensitized silver halide emulsion layers. The dye releasing compounds according to the invention corresponding to formula II preferably have a red-sensitized silver halide emulsion layer associated with them.

If the dye releasing compound is oxidizable then it is itself a reducing agent which is oxidized by the imagewise exposed silver halide, either directly or indirectly with the aid of electron transfer agents (ETA). This results in an imagewise differentiation in the capacity to release the diffusible dye. If, on the other hand, the dye releasing compound is reducible, then it is advantageously used in combination with a limited quantity of reducing agent, a so-called electron donor compound or an electron donor precursor compound which is present in the same layer of binder as the dye releasing compound and the light-sensitive silver halide. The presence of an electron transfer agent may also be advantageous when reducible dye releasing compounds are used in combination with electron donor compounds.

The electron donor compound used in combination with a reducible dye releasing compound acts as reducing agent both for the silver halide and the dye releasing compound. Since the silver halide and the dye releasing compound must to some extent compete with each other for the oxidation of the electron donor compound but the silver halide is more powerful than the dye releasing compound in this reaction, the silver halide becomes the determining factor, depending on its previous imagewise exposure, for the areas of image within which the dye releasing compound will be converted into its reduced form by the electron donor compound.

Under the conditions of development, the electron donor compound which is present in limited quantity is oxidized by the light-sensitive silver halide under the catalytic action of the latent image nuclei produced by exposure in the silver halide and therefore according to the amount of exposure which has taken place, and it is then no longer available for a reaction with the dye releasing compound. An imagewise distribution of unused electron donor compound is then obtained.

Compounds which have been described as electron donor compounds include, for example, non-diffusible or only slightly diffusible derivatives of hydroquinone, of benzisoxazolone, of p-aminophenol and of ascorbic acid (e.g. ascorbyl palmitate) (DE-A-2 908 716).

Other examples of electron donor compounds have been disclosed in DE-A-2 947 425, DE-A-3 006 268, DE-A-3 130 842, DE-A-3 144 037, DE-A-3 217 877 and EP-A-0 124 915 and in Research Disclosure 24 305 (July 1984). Particularly suitable are those electron donor compounds which are formed from their precursor compounds in the layer itself under the conditions of development, i.e. electron donor compounds which before development are present in a virtually inactive, masked form in the recording material. These initially inactive electron donor compounds are then converted into their active form under the conditions of development, for example by the removal of certain protective groups by hydrolysis. In the present case, the term "electron donor compound" also includes these electron donor precursor compounds.

Although a wide variety of methods is available for incorporating the dye releasing compounds according to the invention, it has been found advantageous to incorporate the dye releasing compounds of the present invention in the layers in the form of emulsions by means of so-called oil formers. This has the advantage, particularly when dye releasing compounds which are reducible and decomposable by reduction are used in combination with ED compounds, that the dye releasing compounds and the ED compounds can be brought into very close functional contact in the form of a common emulsion. Suitable oil formers are described, for example, in U.S. Pat. No. 2,322,027, DE-A-1 772 192, DE-A-2 042 659 and DE-A2 049 689. The optimum quantities of dye releasing compound and, if used, of ED compound to be incorporated may be determined by simple routine tests. The dye releasing compound of the present invention may be used, for example, in quantities of 0.05 to 0.2 mol per mol of silver halide and the ED compound, if used at all, in quantities of 0.1 to 0.6 mol per mol of silver halide.

The light-sensitive silver halide emulsions may be emulsions of silver chloride, silver bromide or mixtures thereof, possibly with a small silver iodide content of up to 10 mol-% and they may be used in one of the usual hydrophilic binders. The emulsions may also contain organic or other inorganic silver salts in addition to the light-sensitive silver halides, especially in heat-developable colour photographic recording materials. These additional silver salts are on the whole light-insensitive or at least very much less sensitive than the silver halides. Suitable organic silver salts include, for example, the salts of carboxylic acids, such as silver behenate, or the salts of imino compounds, such as silver benzotriazolate. The binder used for the photographic layers is preferably gelatine but this may be partly or completely replaced by other natural or synthetic binders.

The emulsions may be chemically and/or spectrally sensitized in the usual manner. They may also be stabilized with suitable additives. Suitable chemical sensitizers, spectral sensitizing dyes and stabilizers are described, for example, in Research Disclosure 17643; see in particular Chapters III, IV and VI.

The usual hydrophilic film formers of natural or synthetic origin may be used as protective colloids or binders for the layers of the recording material, e.g. proteins, in particular gelatine. Casting auxiliaries and plasticizers may also be used. See Research Disclosure 17643, Chapters IX, XI and XII.

The layers of binder may be hardened in the usual manner, using comppounds which react with reactive groups in the binder, such as amino groups, carbonyl groups or active methylene groups, to give rise to crosslinking of the binder. Examples include formaldehyde, dialdehydes, α-diketones, compounds containing active halogen atoms, compounds containing oxirane or aziridine groups, compounds containing active vinyl groups such as acryloyl groups or vinyl sulphone groups, and the so-called carboxyl-activating hardeners such as isoxazolium salts, formadinium salts, carbodiimide compounds, carbamoyl pyridinium salts and carbamoyl oxypyridinium salts; see Research Disclsoure 17643, Chapter X. The hardeners may be used singly or as mixtures.

Development of the imagewise exposed colour photographic recording material according to the invention may be initiated by treating the recording material with an aqueous-alkaline, possibly highly viscous developer solution. In that case, the auxiliary developer compounds required for development are either present in the developer solution or partly or completely contained in one or more layers of the colour photographic recording material according to the invention. When development takes place, diffusible dyes are released imagewise from the dye releasing compounds and are then capable of being transferred to an image receptor layer which may be an integral part of the colour photographic recording material of this invention or it may be in contact with its material, at least during the development time. The image receptor layer may therefore be arranged on the same layer support as the light-sensitive element or on a separate layer support. It consists mainly of a binder containing the mordant for fixing the diffusible dyes released from the non-diffusible dye releasing compounds. The mordants used for anionic dyes are preferably long chained quaternary ammonium or phosphonium compounds, e.g. those described in U.S. Pat. No. 3,271,147 or in U.S. Pat. No. 3,271,148. Certain metal salts and their hydroxides which form difficultly soluble compounds with the acid dyes may also be used. Polymeric mordants may also be suitable, for example those described in DE-A-2 315 304, DE-A-2 631 521 or DE-A-2 941 818. The dye mordants are contained in the mordant layer as dispersions in one of the usual hydrophilic binders such as gelatine, polyvinyl pyrrolidone, or partially or completely hydrolysed cellulose esters. Some binders may, of course, function as mordants, e.g. polymers of nitrogen-containing, optionally quaternary bases, such as N-methyl-4-vinylpyridine, 4-vinylpyridine or 1-vinylimidazole, as described, for example, in U.S. Pat. No. 2,484,430. Further examples of suitable mordanting binders include guanyl hydrazone derivatives of alkyl vinyl ketone polymers such as those described, for example, in U.S. Pat. No. 2,882,156, or guanyl hydrazone derivatives of acylstyrene polymers as described, for example, in DE-A-2 009 498. The last-mentioned mordanting binders would, however, generally be used together with other binders, e.g. gelatine.

If the image receptor layer is to be kept in contact with the light-sensitive element after development, then an alkali permeable, light-reflecting layer of binder containing pigment is generally placed between these two layers to serve as optical separation between the negative and positive and as aesthetically attractive image background for the transferred colour image. Such a light-reflecting layer may already be preformed in the light-sensitive colour photographic recording material in known manner or it may be produced in the course of development, also in known manner. If the image receptor layer is arranged between the layer support and the light-sensitive element and is separated from the latter by a preformed light-reflecting layer, then the layer support must either be transparent so that the colour transfer image produced can be viewed through this layer or the light-sensitive element together with the light-reflecting layer must be removed from the image receptor layer to expose the latter. Alternatively, the image receptor layer may be arranged as the uppermost layer in an integral colour photographic recording material, in which case the material may be exposed through the transparent layer support.

After the photographic process, the image receptor layer contains an imagewise distribution of cyan monoazo dyes corresponding to formula I. The dye releasing compound of formula II associated with the originally light-sensitive silver halide emulsion layer is also present in imagewise distribution after processing but as the complementary to the transferred dye image, and may also be used as colour image in known manner (retained image).

In another embodiment, the colour photographic recording material according to the present invention may constitute a heat developable recording material. In that case, development is initiated by a heat treatment and treatment with aqueous baths is generally obviated. In this embodiment, the reactants required for development are contained in one or more layers of the recording material. This applies in particular to development agents, bases or base precursors and so-called thermal solvents or melt formers; see Research Disclosure 17029 (June 1978).

Development of the imagewise exposed colour photographic recording material according to the invention includes, for example in the case of the thermal development process, the steps of silver halide development, production of an imagewise distribution of diffusible dyes and transfer of this imagewise distribution to the image receptor layer by diffusion. This development is initiated by subjecting the exposed recording material to a heat treatment in which the light-sensitive layer of binder is heated to a temperature e.g. in the region of 80° to 250° C. for a time of about 0.5 to 300 seconds. Suitable conditions are thereby provided in the recording material for the development processes, including dye diffusion, without any need for a liquid medium, e.g in the form of a developer bath. Development releases diffusible dyes in imagewise distribution from the dye releasing compounds and transfers them to an image receptor layer which may be an integral constituent of the colour photographic recording material according to the invention or is in contact with this material, at least during the development time.

Imagewise development of silver, release of dye and transfer of colour thus take place synchronously in a single step development process.

Production of the clour image with the colour photographic recording material according to the invention may also take place as a two-step development process in which silver halide development and release of dye take place in the first step at temperatures in the range of 80° to 250° C. and transfer of colour image from the light-sensitive part to an image receptor part in contact therewith is then carried out in a second step, e.g. by heating to a temperature of 50° to 150° C., preferably to 70°-90° C., in which case diffusion aids (solvents) such as water may be applied externally before the light-sensitive part is laminated to the image receptor part.

EXAMPLE 1

Dye C-2 according to the invention (Model dye) and dye V-1 which is not according to the invention and corresponds to the following formula

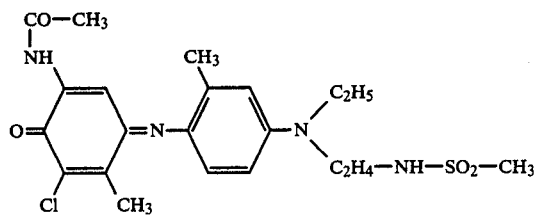

V-1 were each dissolved separately in a small quantity of methyl ethyl ketone and excess 1N KOH was then added to each solution at 20° C. This resulted in gradual destruction of the dye, which could be followed by the reduction in colour density. The following values were found for the half life $t_{\frac{1}{2}}$ of the dye decomposition, measured at the absorption maxima:

|  | $\gamma_{max}$ [nm] | $t_{\frac{1}{2}}$ [min] |
|---|---|---|
| Dye C-2 | 676 | 24 |
| Dye V-1 | 668 | 13 |

This means that the dye according to the invention is more stable to hydrolysis by factor of almost 2. Under the processing conditions normally employed for the dye diffusion process, the cyan dyes according to the invention need not be expected to undergo any detectable decomposition.

EXAMPLE 2

A photographic recording material according to this invention consisting of a light sensitive part (A) and an image receptor part (B) were prepared as described below. The quantities given refer in each case to 1 m².

Part A consisted of a polyethylene terephthalate support to which the following layers were applied in succession:

1. A light-sensitive, red-sensitized silver bromide emulsion corresponding to 0.5 g AgNO₃ and a light-insensitive organic silver salt in the form of silver benzotriazolate corresponding to 0.5 g of AgNO₃, together with 0.648 g of dye releasing compound FA-1, according to the invention, 0.283 g of compound ED-1 (electron donor compound), 0.931 g of palmitic acid diethylamine and 0.931 g of gelatine.

2. An auxiliary layer containing 1.5 g of guanidine trichloroacetate, 0.24 g of 4-hydroxymethyl-4-methylphenidone, 0.028 g of the compound corresponding to the formula

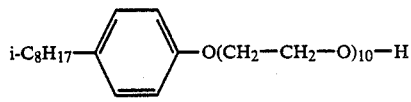

and 1.5 g of gelatine.

3. A hardening layer consisting of an instant hardener and 0.5 g of gelatine.

Part B consisted of a polyethylene coated support carrying the following layers one above the other:

1. A mordant layer containing 3.0 g of a polyvinylimidazole quaternized to an extent of 5% with chloroethanol, and 3 g of gelatine 2. A covering layer containing 1 g of gelatine and 0.35 g of dimethylolurea.

The light-sensitive material was exposed behind a grey wedge and uniformly heated to 120° C. for one minute. This element was then laminated with its active side to the image receptor part B which had previously been left to soak in water for 10 seconds, and the two layers were kept in contact at 70° C. for 2 minutes. The dye receptor sheet was then separated from the light-sensitive part.

Another light-sensitive part was prepared according to the state of the art for comparison. This part contained 0.33 g of dye releasing compound V-2 (not according to the invention) instead of the dye releasing compound FA-1 according to the invention. The two cyan wedges obtained were examined for their colour brilliance and stability to light.

| Side densities (standardized to cyan density = 1.0) | | |
|---|---|---|
| according to the invention | yellow: 0.26 | magenta 0.44 |
| comparison | yellow: 0.28 | magenta 0.48 |

Regression in colour density at density 0.5 after 10⁷ Lux.h according to the invention: 17%, comparison: 57%.

The dye obtained from the compound according to the invention thus had a substantially higher stability to light with at least equal colour brilliance.

ED-1

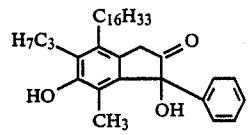

Dye releasing compound V-2

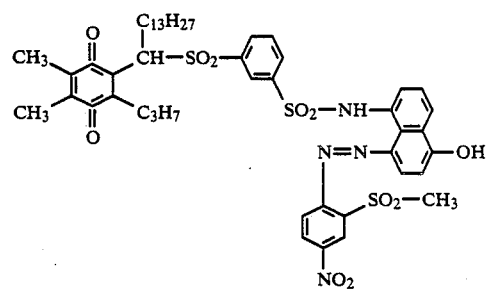

EXAMPLE 3

The light-sensitive part of a part of a recording material was prepared by the method described in Example 2 but without any guanidine trichloroacetate in layer 2.

After exposure, this light-sensitive part was laminated with its active side to an image receptor sheet which had been prepared as described in Example 2 but had previously been soaked for one minute in a 4% aqueous NaOH solution. the sheets were separated after a contact time of 2 minutes at 30° C. An imagewise transfer of the dye with brilliant colour was obtained in the image receptor sheet.

This proves that when treated with aqueous alkali, the dye according to the invention attains its full colour density and colour brilliance without being destroyed by hydrolysis.

We claim:

1. Colour photographic recording material for the production of colour images by the dye diffusion transfer process, containing, associated with at least one light-sensitive silver halide emulsion layer, a non-diffusible, colour providing compound (dye releasing compound) from which a diffusible dye is released under the conditions of alkaline development as a function of the development of the silver halide emulsion layer, characterised in that the dye corresponds to the following formula I

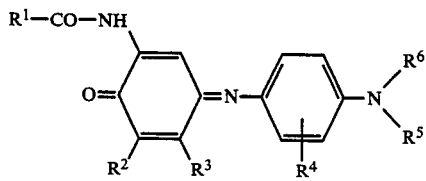

wherein
$R^1$ denotes alkyl, aryl, arylamino, alkoxy or aryloxy,
$R^2$ denotes H or halogen,
$R^3$ denotes alkyl with 2–4 carbon atoms,
$R^4$ denotes H or one or more substituents selected from the group consisting of alkyl, alkoxy, acylamino and halogen, or a substituent in the ortho-position to the group

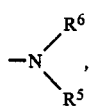

which substituent combines with $R^5$ to complete a cyclic amino group,
$R^5$ denotes alkyl with up to 4 carbon atoms or a group which together with a substituent $R^4$ or together with $R^6$ completes a cyclic amino group, and
$R^6$ denotes alkyl with up to 4 carbon atoms or a group which together with $R^5$ completes a cyclic amino group.

2. Recording material according to claim 1, characterised in that a compound corresponding to the following formula II is associated with at least one light-sensitive silver halide emulsion layer:

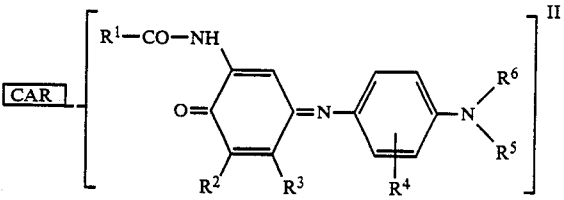

in which formula,
$R^1$ denotes alkyl, aryl, arylamino, alkoxy or aryloxy,
$R^2$ denotes H or halogen,
$R^3$ denotes alkyl with 2 to 4 carbon atoms,
$R^4$ denotes H or one or more substituents selected from the group consisting of alkyl, alkoxy, acylamino and halogen, or a substituent in the ortho-position to the group

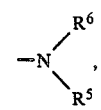

which substituent together with $R^5$ completes a cyclic amino group,
$R^5$ denotes alkyl with up to 4 carbon atoms or a group which together with a substituent denoted by $R^4$ or together with $R^6$ completes a cyclic amino group,
$R^6$ denotes alkyl with up to 4 carbon atoms or a group which together with $R^5$ completes a cyclic amino group,
CAR denotes a carrier group containing at least one group conferring diffusion resistance, and
the broken line denotes a possible linkage.

3. Process for the production of an imagewise distribution of a cyan dye, in which a colour photographic recording material containing a dye releasing compound associated with a silver halide emulsion layer is exposed imagewise and developed to produce an imagewise distribution of a diffusible dye and in which the diffusible dye is transferred to an image receptor layer, characterised in that the diffusible dye corresponds to the following formula

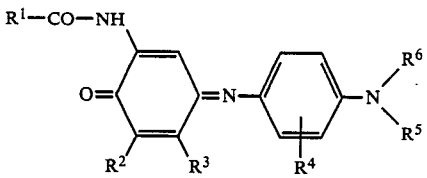

wherein
$R^1$ denotes alkyl, aryl, arylamino, alkoxy or aryloxy,
$R^2$ denotes H or halogen,
$R^3$ denotes alkyl with 2–4 carbon atoms,
$R^4$ denotes H or one or more substituents selected from the group consisting of alkyl, alkoxy, acylamino and halogen or a substituent in the ortho-position to the group

which substituent together with $R^5$ completes a cyclic amino group,
$R^5$ denotes alkyl with up to 4 carbon atoms or a group which together with a substituent denoted by $R^4$ or together with $R^6$ completes a cyclic amino group, and
$R^6$ denotes alkyl with up to 4 carbon atoms or a group which together with $R^5$ completes a cyclic amino group.

4. Process according to claim 3, characterised in that development is brought about by heating.

* * * * *